Oct. 30, 1956 J. WOLLENHAUPT ET AL 2,768,539
ELECTRICALLY CONTROLLED DRILLING MACHINE, PARTICULARLY
FOR DRILLING DEEP HOLES
Filed March 17, 1952 3 Sheets-Sheet 1
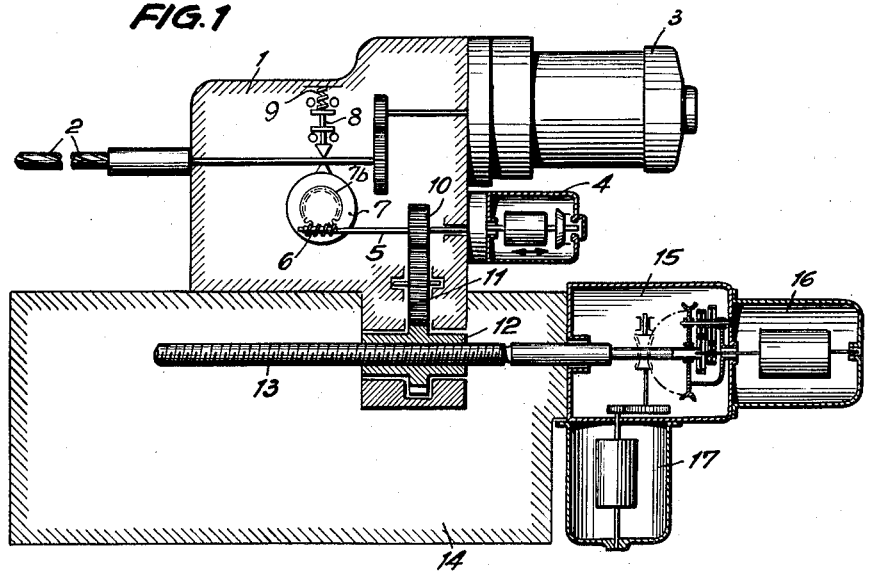
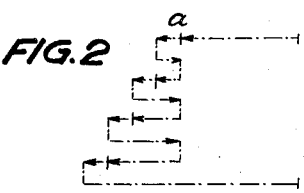
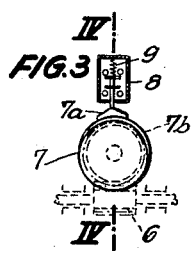
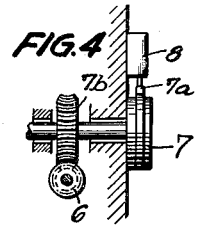
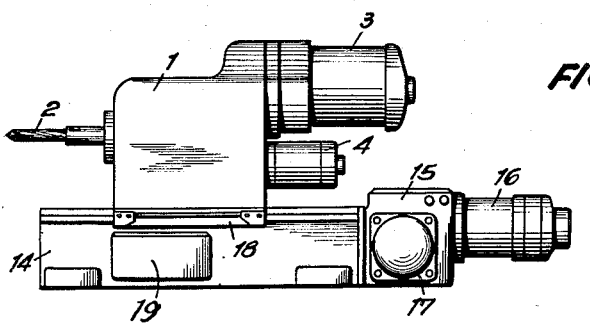
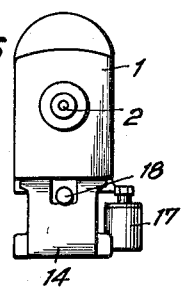
INVENTOR

INVENTOR

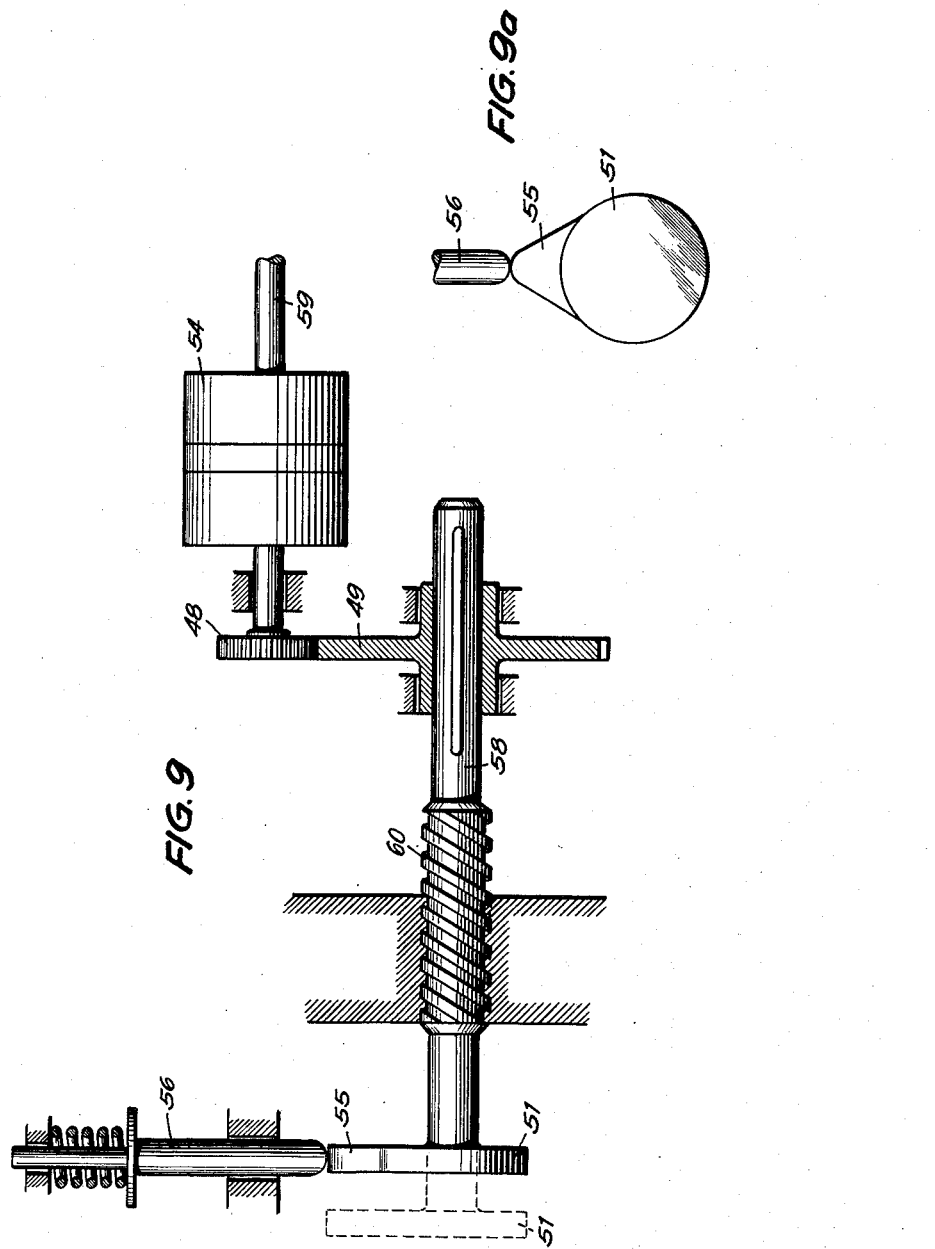

United States Patent Office 2,768,539
Patented Oct. 30, 1956

2,768,539

ELECTRICALLY CONTROLLED DRILLING MACHINE, PARTICULARLY FOR DRILLING DEEP HOLES

Jakob Wollenhaupt, Remscheid-Hasten, and Kurt Maecker, Dusseldorf, Germany

Application March 17, 1952, Serial No. 277,028

Claims priority, application Germany March 21, 1951

10 Claims. (Cl. 77—32.3)

The present invention relates to drilling machines and, more particularly, to electrically controlled drilling machines, especially for drilling deep holes.

With drilling machines heretofore known, the feed is derived either directly from the bore spindle or from the bore spindle drive through a shiftable clutch. Also, the fast feed may be derived from the bore spindle drive through a shiftable magnetic clutch.

Among others, it is an object of the present invention to provide an electrically controlled drilling machine, particularly for drilling deep holes, in which means are provided adapted clearly to indicate the movement and the extent of said movement for removing the bore chips from the bore being drilled.

This object and others will appear more clearly from the following specification in connection with the accompanying drawings in which:

Fig. 1 diagrammatically illustrates a drilling machine according to the present invention, said figure showing a special motor for removing the bore chips from the bore being drilled and also showing the rapid traverse unit.

Fig. 2 is a diagrammatic illustration of the so-called pilgrim step arrangement.

Fig. 3 illustrates a slight enlargement of a part of Fig. 1.

Fig. 4 is a section along the line IV—IV of Fig. 3.

Fig. 5 diagrammatically illustrates the drilling machine with a rapid traverse unit and the shifting-control-cam mechanism pertaining thereto.

Fig. 6 is a side view of the arrangement shown in Fig. 5.

Figure 7:
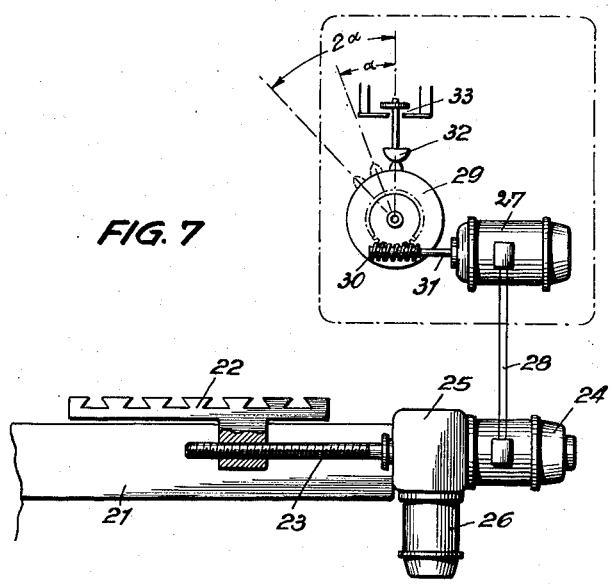

Fig. 7 represents an embodiment including a control disc which is driven by a special transmission motor.

Figure 8:
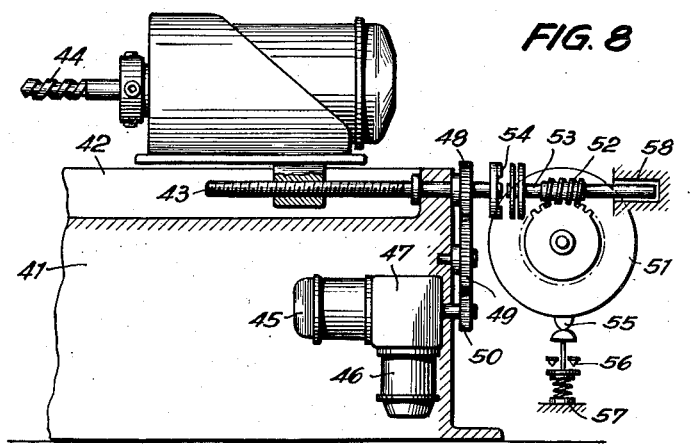

Fig. 8 is an arrangement in which the control disc is actuated by a feed-speed-drive.

Fig. 9 is a still further modification of the present invention.

Fig. 9a represents a detail of the arrangement shown in Fig. 9.

General arrangement

According to an embodiment of the present invention which is selected by way of example, a fast speed motor and a feed motor are being used, both of which act upon the output shaft through a planetary gear transmission and the switching off and reversal thereof is effected when the drill head hits a fixed abutment.

The transmission comprises a sensitive fixed abutment-disconnecting mechanism adapted to acuate electric contacts when the drill head hits a fixed abutment or when the maximum torque or a predetermined adjustable feeding pressure has been exceeded.

The said contacts are adapted to bring about the disconnection of the feed, to make effective the fast return or to cause other actions. In addition to operations brought about by the fixed abutments, the device may also cause other operations in conformity with the feed pressure. By means of this rapid traverse unit, the normal course of operation of the various steps may be controlled fully automatically.

The drilling of deep holes requires the so-called pilgrim step arrangement which is as follows:

The drill head moves at fast speed up to the workpiece to be drilled. Thereupon, at the feed speed a predetermined bore of the depth $a$ is drilled. Thereafter, the table moves backwards at fast speed by the distance $a$ up to its starting position. This movement causes the removal of chips from the bored hole. Thereupon, the drill head moves at fast speed forwardly by the distance $a$, i. e. up to that point in the workpiece up to which during the first partial stroke the hole was bored, and from there the drill head is advanced or fed by a further partial stroke so that the length of the bore is again increased by the same distance $a$ as before. Now the drill head is retracted at fast speed again to its starting position, i. e. this time by the distance $2a$, and so forth. When the entire depth of the bore has been drilled, the drill head returns at fast speed to its initial starting position. At the end of each partial stroke $a$, the chips are being removed. During this operation, the drive of the threaded spindle of the drill head is effected through the fast traverse motor through the transmission mentioned above.

The primary feature of the present invention consists in that a control disc for measuring the chip removing movement is provided, which disc during the chip removing operation is driven so, that during the fast return movement of the drill head, it oscillates out of its normal or rest position, while the said disc during the following fast advance performs a return movement over the same distance. When the said disc has returned to its initial or starting position, it actuates a switch which stops the chip removing movement and simultaneously the control disc.

The stroke $a$ corresponds to an angle $\alpha$ by which the control disc oscillator during the chip removing movement. During the advance of the drill head in the direction of the feed, which advance follows the chip removing movement, the control disc moves by the measured distance back to its initial position.

Structural arrangement

Referring now to the drawings in detail and Figures 1 to 6 in particular, the drilling machine shown in the drawing comprises a drill head 1 and is provided with a bore spindle 2, a motor 3 for driving the working spindle and a motor 4 for bringing about the removal of the chips and for driving the control disc 7. The drilling machine furthermore comprises a feed transmission 15 with a feed motor 16, the fast speed or fast traverse motor 17, and the feed spindle 13. The bed of the machine is designated with the reference numeral 14. The motor 4 which brings about the chip removal movement has a shaft 5 to which is connected a gear 10 which latter meshes with a gear 11. Gear 11, in turn, engages the rotatable nut 12, journalled on the feed spindle 13. One end of the shaft 5 of the motor 4 has connected thereto a worm 6 engaging a gear 7b fixed to the shaft of a control disc 7 (see Fig. 4) so as to be adapted to drive the same. The control disc 7 is provided with a cam 7a adapted to actuate a switch 8.

The operation of the device is as follows:

First, the drill head moves at fast speed up to the workpiece. Then a switch-over is effected to make the feed effective, and the drill head is advanced by the distance $a$ (Fig. 2), i. e. the bore spindle 2 enters the workpiece by the distance $a$. At the end of the partial stroke $a$, the chip removing motor 4 is made effective. The nut 12 is now driven by the motor 4 at fast speed through the gears 10 and 11 so that the drill head is moved away at fast speed from the workpiece and, thus, the drilling tool is withdrawn from the workpiece, thereby effecting the first removal of the chips. At the end of this withdrawal or return movement, a limit switch is actuated which reverses the motor 4. The distance $a$ through which the drill head moves during the first chip removing movement is reflected on the control disc 7 by an angle $a$ which is the angle by which said disc was turned. After the limit switch has been actuated at the end of this chip removing movement and after the reversal of the motor 4 brought about thereby, the drilling tool again moves into the workpiece in the direction of the drilling feed. At the same time, the control disc 7 turns or oscillates back to its initial or starting position by the same angle or distance which was measured by said disc during the chip removing movement. When the control disc 7 arrives at its initial or starting position, the cam 7a actuates the switch 8 and thus stops the motor 4, while the said motor 16 is made effective.

The drill head now again advances by the distance $a$. At the end of this partial stroke $a$, the chip removing motor 4 is again switched on to effect the second chip removing operation. Now the drill head is retracted at fast speed by the distance $2a$ and thus withdraws the drilling tool and the chips from the workpiece. The distance $2a$ is reflected on the control disc 7 by an increased angle of rotation $2a$. After the reversal of the motor 4 brought about by the above-mentioned switch, the disc 7 again returns to its initial position and switches off the chip removing motor 4, while said motor 16 is again switched on to advance the drilling tool by another partial stroke $a$. After this partial stroke $a$ during the advance feed, the drill head is retracted during the chip removing operation by a distance $3a$ which corresponds to an angle $3a$ on the control disc 7. When the total depth of the bore has been drilled out, the fast return is brought about by the fixed abutment disconnecting mechanism in the transmission 15, and the spindle is returned to its initial position by the fast traverse motor 17.

As will be seen from Figs. 3 and 4, the control disc 7 by means of its control cam 7a, contacts the switch 8 which latter rests on a pre-loaded spring 9. The gear 7b fixed to the shaft of the control disc 7 meshes with a worm 6 connected to the adjacent end of shaft 5 pertaining to the chip removing motor 4.

In Figures 5 and 6, the reference numeral 18 designates the control cam mechanism, while the reference numeral 19 designates the control mechanism of the fast speed-feed-drive unit. The motor 4 arranged according to Fig. 1 for effecting the chip removing movement requires a special construction of the drill head unit and of the drilling unit.

The embodiments shown in Figures 7 and 8 however, make it possible to use normal standard units without any special structural changes, to use the same for drilling deep holes.

According to the embodiment shown in Fig. 7, the chip removing operation is effected by the fast speed or fast traverse motor. A special transmission motor is provided for driving the control disc which motor is switched on, reversed, and switched off simultaneously with the fast speed motor. The construction shown in Fig. 7 comprises a machine bed 21 with a movable drill head 22 adapted to be moved by the feed spindle 23. During the chip removing movement, the drill head 22 is actuated by the fast speed or fast traverse motor 24 through the feed transmission 25. The feed motor is designated with the reference numeral 26. A transmission motor 27 is connected with the fast speed motor 24 through an electric synchronous connection 28. The motor 27 drives the control disc 29 during the chip removing movement through a worm 30 which latter is connected to the shaft 31 of the motor 27. In its initial or normal rest position, the control disc 29 actuates through a control cam 32 a switch 33 which rests on a spring (not shown in the drawing).

The operation of the arrangement is as follows:

First, the drill head 22 moves at fast or rapid traverse speed up to the workpiece. Then a switch-over is effected to make the feed effective, and the drill head 22 is by motor 26 advanced by the partial stroke $a$, i. e. the bore spindle enters into the workpiece by the partial stroke $a$. At the end of said stroke $a$, the fast speed or rapid traverse motor 24 is made effective in the direction of the return movement of the drill head. Simultaneously, also the transmission motor 27 is made effective for actuation of the control disc 29. During the return movement of the drill head 22 return movement brings about the chip removal, the control disc 29 turns by an angle $a$ corresponding to the said partial stroke $a$. At the end of said partial stroke $a$, i. e. at the end of the first chip removing movement, the fast speed or rapid traverse motor 24 and the motor 27 are simultaneously reversed. The drill head 22 now again moves at fast speed into the workpiece by the same partial stroke $a$. At the same time, the control disc 29 oscillates back to its initial position by the same angle or amount measured during the first chip removing operation. When the control disc 29 arrives at its initial position, it actuates by means of its control cam 32 the switch 33 which causes both motors 24 and 27 to stop. Thereupon the drilling tool is again advanced by said motor 26 into the workpiece by the partial stroke $a$. At this end of the partial stroke $a$, the fast speed motor 24 is again made effective together with the transmission motor 27 in the direction of the return movement of the drill head 22. The drill head now returns by double the partial stroke, i. e. by $2a$, at fast or rapid traverse speed, thereby effecting the second chip removing operation. During this time, the control disc 29 turns by twice the partial angle, i. e. by $2a$. After the reversal of the two motors 24 and 27, the drill head again advances by the distance $2a$, and the control disc 29 turns back into its initial position by the angle $2a$ while switching off both motors 24 and 27. Thereupon the drilling tool is by means of motor 26 advanced into the workpiece by a further distance $a$, and so forth.

When the total depth of the bore to be drilled has been reached, the fixed abutment disconnecting mechanism in the feed transmission switches on the fast return, and the spindle returns to its initial position. At the normal speed advance (first speed advance), and during the return movement of the drill head, after the drilling operation has been completed, the transmission motor for driving the control disc is not influenced.

The fast speed or rapid traverse motor 24 and the transmission motor 27 for the control disc 29 are designed as braking motors and are braked for a short time after the switching off operation has been effected. If, when using normal three-phase motors, nevertheless differences occur in the nominal speeds of rotation, these differences are so small that they will not or practically not be noticeable during the individual partial stroke. In special instances, both motors may be coupled with each other by means of one of the known synchronous circuits.

According to a further embodiment of the invention, the control disc for measuring the chip removing movement may also be connected directly to the fast speed transmission, while a chip removal is again effected by the fast speed or rapid traverse motor. The connection of the control disc with the fast speed advance transmission is then effected by means of an electro-magnetic clutch. This embodiment is illustrated in Fig. 8. The structure shown in Fig. 8 comprises a machine bed 41 with a movable drill head 42 carrying the drilling unit with the bore spindle 44. The drill head 41 is moved by the feed spindle 43 which latter is driven by the fast traverse motor 45 and the feed motor 46 through the feed transmission 47. The connection of the feed transmission 47 with the feed spindle 43 is effected through gears 48, 49, and 50. The control disc 51 is connected with the fast speed advance transmission 47 through the electro-magnetic clutch 54. The control disc 51, similar to the arrangement of Fig. 7 is provided with a worm wheel engaging a worm 52 connected to the shaft 53 of clutch 54. The control disc 51 is adapted in its initial or normal rest position to actuate a switch 56 by means of a control cam 55. The switch 56 rests upon a spring 57. The reference numeral 58 designates a bearing for the shaft 53.

The operation of this device is the same as that described in connection with Fig. 7. In other words, at the beginning of the chip removing movement, i. e. when the fast return is being actuated, the clutch 54 for the control disc 51 is made effective together with the fast traverse motor 45 for the drill head 42. When the fast traverse motor 45 is reversed for advancing the drill head, also the control disc 51 is influenced in the opposite direction of rotation through the clutch 54 and when again reaching its initial position switches off the fast traverse motor 45 and simultaneously also the clutch 54.

As will be appreciated from the description so far, the total depth of the bore cannot be greater than it would correspond to one complete revolution of the control disc. Therefore, for a greater bore, a control disc having a greater diameter is required, while for a shorter bore, a control disc of smaller diameter will be selected. In order to be able to bore holes of different depth with one and the same control disc, there is, according to a further development of the invention, provided an arrangement shown in Figs. 9 and 9a. According to the arrangement shown therein, a control disc 51 with an actuating cam 55 is connected to a shaft 58 which is provided with a threaded section 60. As will be clear from Fig. 9, the control disc 51 in response to the rotation of shaft 58 performs a twofold movement, namely while rotating it also moves in the direction of the longitudinal axis of shaft 58, which axial movement is brought about by the threaded shaft section 60. The arrangement is such that after a complete revolution, the cam 55 does not contact anymore the switch 56. Consequently, the control disc 51 may then perform as many revolutions as the length of the threaded section 60 will permit, which means that bores of different depth may be drilled without having to exchange the disc. In as much as all other parts of Fig. 9 are similar to those described in connection with Fig. 8, no further description of Fig. 9 appears to be necessary. Clutch 54 connects the feed transmission through drive shaft 59 and gears 48, 49 with the control disc 51 which latter is adapted to actuate switch 56.

Each time during the advance after the chip removal, precisely when the drill head hits the workpiece, the feed must be made effective. In order to prevent that the feed is made effective too late so that the spindle would hit the workpiece at the fast speed advance, the arrangement having a special chip removing motor according to Figures 1, 3 and 4 is such that simultaneously with the switching on of the chip removing motor, the feed motor is made effective in the direction of a withdrawal movement of the drill head so that the drill head is moved backwards during the chip removing operation by about 1 to 2 millimeters. In this way, it is avoided that bore chips will be present in front of the drilling tool which might harmfully affect the cutting edge of the tool. Since it would increase the total time required for the drilling operation, if this additional return movement of the table were too great, the time for switching on the feed motor may be limited in regard to the time for switching on the chip removing motor, by a special timing mechanism. In order to assure this precision, the chip removing motor is preferably designed as braking motor (motor with adjustable rotor or additional electro-mechanical brake).

According to the embodiments shown in Figures 7 to 9 in which the chip removal is effected by the fast traverse motor, for the same purpose, the feed motor is during the chip removing operation switched on, in addition to the fast traverse motor, in the direction of the return movement of the table. Inasmuch as both speeds are added together during the return movement while they are subtracted from each other during the advance movement, a difference will occur with the next forward movement of the drill head. Thus in view of the differences of the speed of rotation of the two motors, the drill head will move backwards at a higher speed than the control disc, however, it will advance at a lower speed than the control disc. Thus, the rapid traverse is switched off shortly before the end of the already bored distance and the feeding of the tool into the workpiece is then switched on. The switching off point can precisely be predetermined inasmuch as the rapid traverse is instantaneously stopped by the electro-magnetic brake in a precisely determined position, mostly about 0.5 to 2 millimeters ahead of the material.

If desired, the control disc may be provided with a second adjustable cam adapted to actuate a second switch or a second contact of the switch. This second switch or contact switches off the rapid traverse motor for the drill head spindle already before the control disc has again reached its initial position. If the circumference of the control disc corresponds to the drilling stroke in millimeters, the adjustment of the second cam will prematurely switch over to feed. If a transmission motor is provided for driving the control disc, such motor will, after the rapid traverse motor has been switched off, continue to run at the same speed until the control disc has reached its initial position. The first cam and the first switch in such instance only switch off the transmission motor.

If the control disc is actuated by a clutch, it would, after the rapid traverse motor has been switched off by the second cam or the second switch or contact, move into its initial position at reduced speed in accordance with the feeding speed of the drill head spindle. At the end of the movement of the control disc, it is merely necessary to disconnect the clutch from the disc by the first cam and the first switch. The drill will then have reached precisely the pre-drilled position, and now a further partial stroke will begin.

The partial stroke *a* may be adjusted by a timing mechanism or other adjustable contact effecting means.

The initiation of the chip removing movement may also be effected by means of a fixed abutment disconnecting mechanism in the feed transmission as mentioned above. The fixed abutment spring in the transmission is then adjusted so that a slight increase in the boring pressure which increase will occur after a certain but not precisely adjustable bore depth, will suffice for initiating the chip removing process. If desired also a new operation may be made effective by the increase of the drilling torque. To this end, the drill is received by a normal torque safety chuck. This safety chuck may be an appropriate slide clutch so that the drill, after a predetermined torque has been exceeded, will simply stop. Since, however, the feed continues, there will automatically be produced an increase in pressure which will actuate the fixed abutment switch and thus bring about the chip removing operation.

It is, of course, understood that the present invention is, by no means, limited to the particular constructions shown in the drawing but also comprises any modifications within the scope of the appended claims.

What we claim is:

1. An electrically controlled drilling machine, particularly for drilling deep holes, which comprises in combination: a reciprocable drill head for supporting a drilling tool, driving means having driving connection with said drill head for selectively advancing or retracting said drill head at a fast speed, a control disc oscillatably journalled in said drill head and operable to measure the retraction stroke of said drill head for removal of bore chips, said control disc normally occupying an initial or rest position relative to said drill head, means effecting driving connection between said driving means and said control disc and operable to cause said control disc during the fast retraction movement of said drill head to turn away from its initial or rest position and during the subsequent fast advance movement of said drill head to return to its initial or rest position, switch means operatively connected by said control disc with said driving means thereby in response to the return of said disc to its initial or rest position said fast advance movement of said drill head is terminated and said disc is caused to stop in said initial or rest position, and feed motor means having driving connection with said drill head and operable subsequent to the termination of said fast advance movement of said drill head to advance the latter at feeding speed.

2. A drilling machine according to claim 1, which includes a threaded shaft having fixedly connected thereto said control disc and being movable in a stationary thread to thereby cause said disc to move in the longitudinal direction of said shaft in response to a turning movement of said disc.

3. An electrically controlled drilling machine, particularly for drilling deep holes, which comprises in combination: a reciprocable drill head for supporting a drilling tool, driving means having driving connection with said drill head for selectively advancing at a fast speed said drill head toward a workpiece to be drilled or retracting said drill head from the drilled bore of said workpiece at a fast speed, a control disc oscillatably journalled in said drill head and normally occupying an initial or rest position relative to said drill head, means effecting driving connection between said driving means and said control disc and operable to cause said control disc during said fast retraction movement of said drill head to turn away from its initial or rest position by an angle corresponding to the total stroke of said fast retraction movement to thereby measure said fast retraction stroke, said driving connection effecting means also being operable to cause said control disc to return to its initial or rest position during the fast advance movement of said drill head following said first mentioned fast retraction movement, said control disc being provided with a cam, said motor means having driving connection with said drill head and being operable to advance said drill head at feeding speed, and limit switch means operable by said cam in said initial or rest position of said disc whereby said fast advance movement of said drill head is terminated and said disc is caused to stop in said initial or rest position while said feed motor is caused to advance said drill head.

4. An electrically controlled drilling machine, particularly for drilling deep holes, which comprises in combination: a reciprocable drill head for supporting a drilling tool, a motor having driving connection with said drill head for selectively advancing or retracting said drill head at a fast speed, a control disc oscillatably journalled in said drill head and provided with a cam, said control disc being operable to measure the retraction stroke of said drill head for removal of bore chips and normally occupying a certain rest position relative to said drill head, gear means drivingly connected to said motor and said control disc and operable to cause said control disc during the fast retraction movement of said drill head to turn about its axis away from its initial or rest position and during the subsequent fast advance movement of said drill head to return to its initial or rest position, a threaded spindle, said motor means having driving connection with said spindle, nut means rotatably journalled on said spindle and carried by said drill head, said nut means also being drivingly connected with said gear means, step-down transmission means drivingly connected with said motor and said control disc, and limit switch means operable by said cam in response to the return of said disc to said rest position whereby said fast advance movement is terminated and the feeding movement by said feed motor means is initiated.

5. An electrically controlled drilling machine, particularly for drilling deep holes, which comprises in combination: a reciprocable drill head for supporting a drilling tool, said drill head being operable to move toward and into a workpiece to be drilled and to be retracted from said workpiece for removal of bore chips, a control disc oscillatably journalled in said drill head and normally occupying a certain rest position relative to said drill head, said disc being rotatable about its axis in one direction from said rest position in response to the initiation of and for the duration of said chip removal stroke of said drill head, said disc also being operable to return to said rest position in response to the readvancing movement of said drill head subsequent to the termination of said chip removal stroke, first motor means drivingly connected to said control disc for effecting turning movement of the latter, second motor means having driving connection with said drill head for causing the latter to effect a chip removal stroke, and means co-operating with said control disc and electrically connected with said first and said second motors for substantially simultaneously effecting a change in the operation of said first motor and of said second motor to make the same effective, reverse the same and stop the same in accordance with the operation of said control disc.

6. An electrically controlled drilling machine, particularly for drilling deep holes, which comprises in combination: a reciprocable drill head for effecting an advancing stroke and a retraction stroke, a disc turnable about its axis for measuring the retraction stroke of said drilling tool during a chip removal stroke of the latter, said disc being oscillatably journalled in said drill head and normally occupying a certain rest position relative to said drill head, driving means having driving connection with said drill head for selectively advancing or retracting the same at a fast speed, said driving means including a fast speed motor for effecting the chip removal operation, rapid traverse means for advancing said drill head toward the workpiece to be drilled prior to the actual drilling operation, electro-magnetic clutch means arranged for connection with said driving means and said disc, means operable automatically to effect driving connection between said disc and said rapid traverse means through said clutch means during said chip removal stroke to thereby turn said disc in conformity with the length of said chip removal stroke of said drill head, means drivingly connected to said rapid traverse means and operable to return said disc to said rest position during the advance of said drill head following a chip removal stroke, and switch means operable by said disc at the end of said last mentioned return movement of said disc for terminating said rapid traverse advancing stroke and initiating a feeding stroke of said drill head.

7. A drilling machine according to claim 6, which includes feeding means for feeding a drilling tool carried by said drill head into the workpiece to be drilled, and which also includes means operable in response to the initiation of the chip removal stroke also to make said feeding means effective in the direction of retraction of said drill head.

8. An electrically controlled drilling machine, particularly for drilling deep holes, which comprises in combination: a reciprocable drill head for supporting a drilling tool, a rotatable disc operable to measure the retraction stroke of said drill head during the chip removal of the latter, said disc being oscillatably journalled in said drill head and normally occupying a certain rest position relative to said drill head, means drivingly interconnecting said disc and said drill head to cause said disc to turn in one direction by an angle proportional to said retraction stroke and to turn in the opposite direction by the same angle during the subsequent advancing stroke of said drill head, a motor operatively connected to said drill head for selectively advancing or returning the same at fast speed, feeding means for feeding said drilling tool into the workpiece to be drilled, and means operable to bring about actuation of said feeding means simultaneously with the advancing of said drill head by said motor to thereby reduce the fast advance stroke of said drill head with regard to its preceding fast retraction stroke.

9. An electrically controlled drilling machine, particularly for drilling deep holes, which comprises in combination: a reciprocable drill head for supporting a drilling tool, a disc oscillatably journalled in said drill head, first cam means carried by said disc, a fast speed motor drivingly connected with said drill head and operable to effect a fast retraction stroke of said drill head for causing said drilling tool to remove the bore chips from the drilled bore, means drivingly connecting said fast speed motor with said disc to rotate the same from a predetermined first position into a second position corresponding to the chip removal stroke of said drill head and back to said first position, means operable by said first cam means for stopping said fast speed motor in response to said disc returning to said first position, a feed motor for feeding said drilling tool into the material to be drilled, second cam means carried by said disc, and means operable by said second cam means when said disc has returned to its first position for stopping said feeding means.

10. In an electrically controlled drilling machine, particularly for drilling deep holes, the combination of: a reciprocable drill head for supporting a drilling tool, fast speed motor means having a driving connection with said drill head for fast movement of said tool toward and fast retraction of said tool from said workpiece to remove the bore chips therefrom, a control disc, electrically controlled clutch means operable to effect driving connection between said fast speed motor means and said control disc for turning said control disc in one direction and the opposite direction from and into a predetermined rest position, and switch means operable in response to predetermined movements of said drill head to cause said clutch means to effect driving connection between said fast speed motor means and said control disc to move said control disc in one direction by an amount proportional to the length of the withdrawal stroke of said tool from the workpiece for removing bore chips from the respective drilled bore, and to move said control disc in the opposite direction back to said rest position while said drill head is again advanced to said workpiece.

References Cited in the file of this patent
UNITED STATES PATENTS
2,053,399    Kingsbury _____ Sept. 8, 1936